Figure 3:
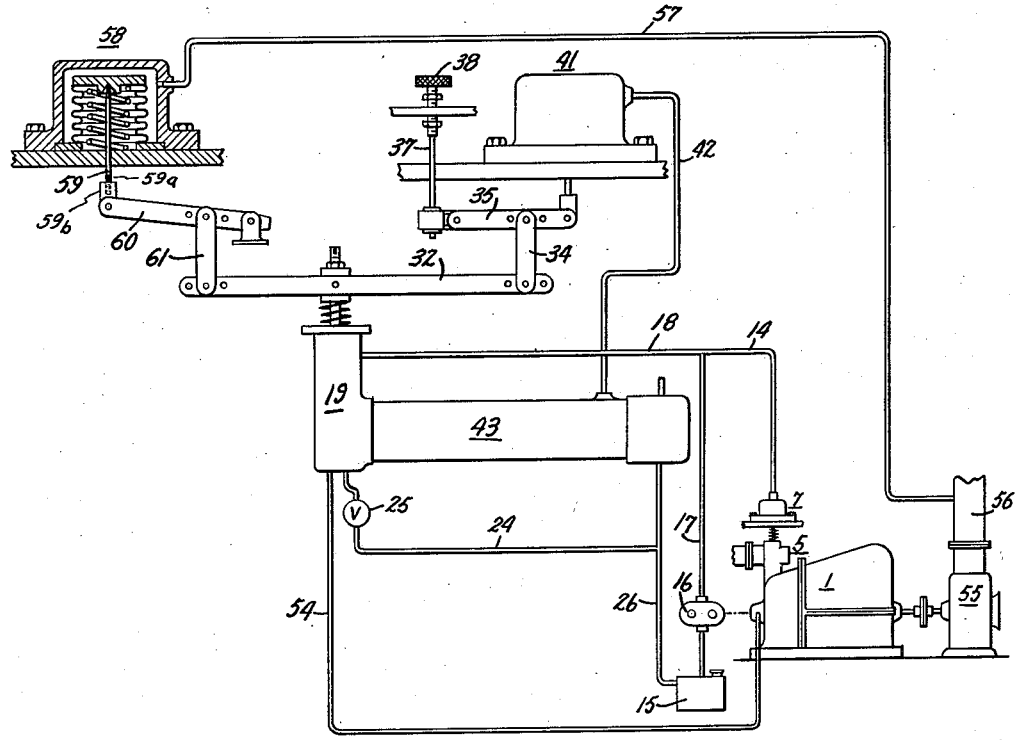

Dec. 16, 1952
S. JACOBS
2,621,672
LIQUID ACTUATED PRIME MOVER REGULATING
SYSTEM WITH VISCOSITY CORRECTION
Filed Oct. 1, 1947
2 SHEETS—SHEET 1
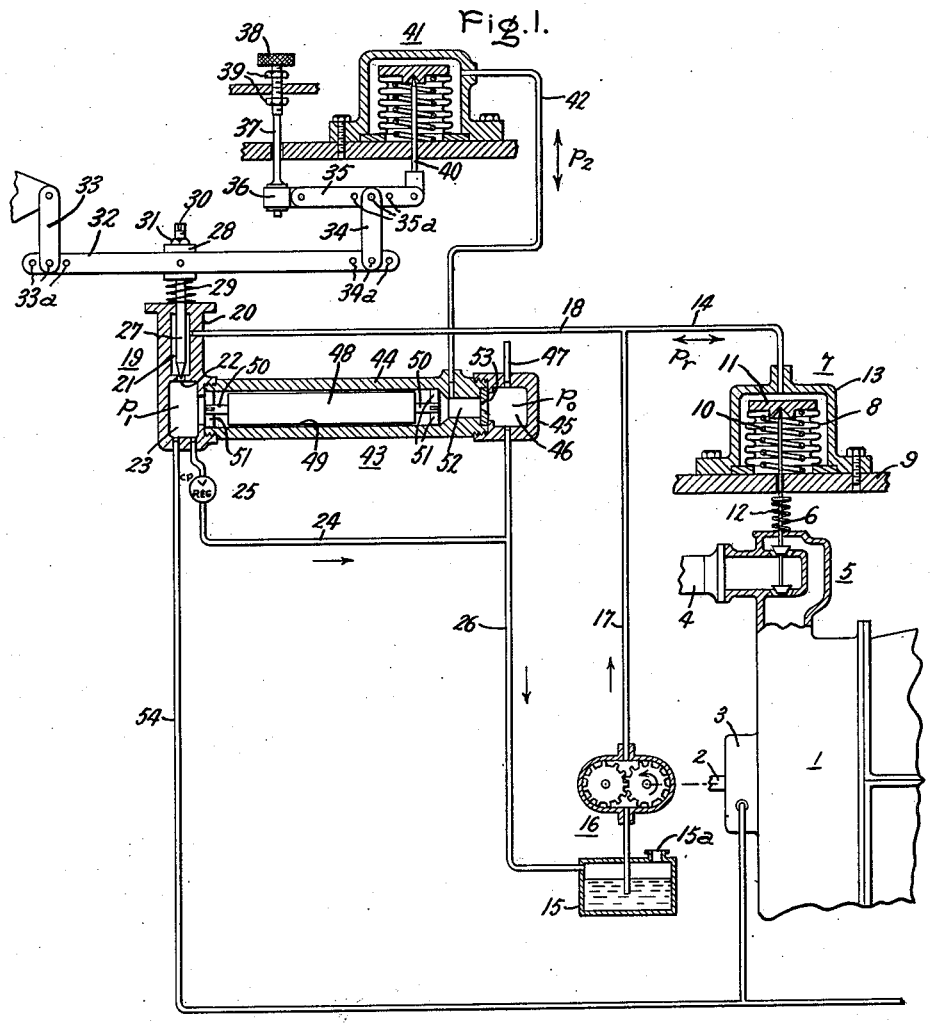
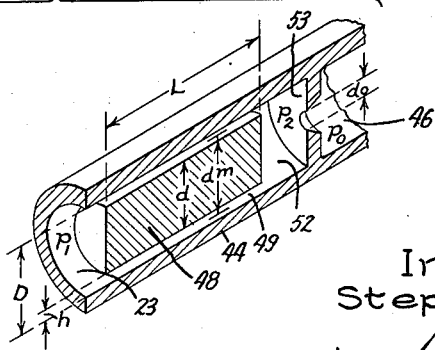
REPRESENTATIVE
DIMENSIONS FOR
VISCOSITY CORRECTOR
$D = .623"$
$h = .017"$
$L = 4"$
$d_0 = .060"$
Inventor:
Stephen Jacobs,
by Prowell S. Mack
His Attorney.

Dec. 16, 1952

S. JACOBS 2,621,672

LIQUID ACTUATED PRIME MOVER REGULATING
SYSTEM WITH VISCOSITY CORRECTION

Filed Oct. 1, 1947

2 SHEETS—SHEET 2

Inventor:
Stephen Jacobs,
by *Prowell S. Mack*
His Attorney.

Patented Dec. 16, 1952

2,621,672

UNITED STATES PATENT OFFICE 2,621,672

LIQUID ACTUATED PRIME MOVER REGULATING SYSTEM WITH VISCOSITY CORRECTION

Stephen Jacobs, Fitchburg, Mass., assignor to General Electric Company, a corporation of New York Application October 1, 1947, Serial No. 777,356

6 Claims. (Cl. 137—20)

This invention relates to prime mover regulating systems of the type known generally as "oil governors," which have a positive displacement pump driven at a speed bearing a fixed ratio to the speed of the prime mover governed. Liquid discharged by the pump passes through a restricted orifice, the pressure drop across which varies as a function of the rate of flow, which is in turn a known function of the speed of rotation of the pump. The pressure generated between the pump and the orifice is taken as a measure of the turbine speed and is employed to actuate various devices for regulating the speed of the prime mover.

Such a governing system is particularly attractive for use in connection with small steam turbines used to drive various loads such as pumps, compressors, ventilating fans, and many other types of industrial equipment. For such applications there may be a common oil system supplying both the liquid for the governing system and for lubricating the bearings. Because of the very wide range of operating temperatures to which the turbine and its governor may be subjected in service, the viscosity of the governor operating liquid changes materially, with the result that the governor fails to hold the desired speed. In the past many proposals have been made for correcting the governing errors introduced into a system of the type described by the above-mentioned changes in viscosity. These systems known to the prior art have been found to be unreliable in operation or unsatisfactory for other reasons and, therefore, have not come into general use.

Accordingly, it is an object of the present invention to provide an oil governing system of the type described incorporating improved means for automatically correcting the operation of the governor so as to compensate for changes in viscosity of the operating liquid.

A further object is to provide viscosity correcting means for a governing system of the type described which is simple in mechanical construction, easy to manufacture, effective to hold prime mover speed accurately at the desired value over a wide range of viscosities, and capable of operating for long periods under difficult conditions without maintenance.

Figure 4:
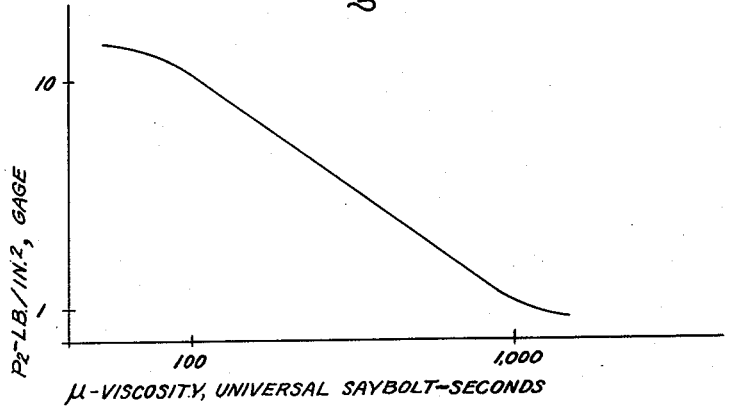

Other objects and advantages will be apparent from the following description taken in connection with the accompanying drawings in which Fig. 1 is a somewhat diagrammatic representation of a prime mover powerplant having an oil governor incorporating viscosity correcting means in accordance with the invention; Fig. 2 is a still more diagrammatic view, to an enlarged scale, of the viscosity signal producing element illustrating the relative proportions thereof; Fig. 3 is a diagrammatic representation of a turbine powerplant in which a governing system incorporating the invention is arranged to automatically hold constant an operating condition of a driven machine; and Fig. 4 is a curve illustrating the performance of the viscosity corrector.

Referring now to Fig. 1, the invention is illustrated as applied to a prime mover such as a steam turbine 1 having a rotor shaft 2 supported in suitable bearings one of which is contained in the turbine end housing 3. Motive fluid is supplied through the conduit 4, the rate of steam admission to the turbine being regulated by a suitable control device, for instance, a throttle valve represented generally at 5 as being of the "balanced" type. This prime mover control device is actuated by a control member which may be in the form of an actuating rod 6 connected to a hydraulic motor indicated generally at 7.

The hydraulic motor 7 may be of any suitable type but is shown as comprising a flexible bellows 8 supported on a suitable fixed base 9 and biased by an interior coil spring 10 to its fully extended position. A movable disk 11 is secured to the free end of bellows 8 and forms a socket for receiving the end of actuating rod 6. A suitable spring 12 engages a flange on rod 6 so as to bias the rod into operative engagement with the bellows head member 11. The pressure chamber of hydraulic motor 7 is formed by an outer housing 13 surrounding bellows 8 and secured to base 9 as will be apparent from the drawing. A fluctuating pressure signal $P_r$ is supplied to hydraulic motor 7 by a conduit 14.

A suitable liquid such as a petroleum oil for lubricating and governing the prime mover is supplied from a reservoir 15 by a positive displacement pump, indicated generally at 16 as being of the well-known gear type having one gear driven from the turbine shaft 2 at a fixed speed ratio. The pump discharge conduit 17 is connected to conduit 14 and to a second "bleed conduit" 18 which supplies governing and lubricating oil to the housing of a needle valve indicated generally at 19. Valve 19 is of a type adapted to meter liquid very accurately and comprises a housing 20 defining an inlet chamber 21 to which oil is supplied through conduit 18, a metering orifice 22 and a discharge chamber 23. Connected to housing 20 in communication with discharge chamber 23 is a pressure relief conduit 24 containing a pressure regulating valve 25. Liquid discharged from the valve 25 is conducted through pipe 24 to a drain conduit 26 whence it returns to the reservoir 15.

The rate of flow of oil through bleed conduit 18 is controlled by a movable needle 27, which has an accurately contoured end cooperating with the orifice 22 and is adapted to be positioned by the following mechanism. At its exterior end, the liquid regulating needle 27 is provided with an internally threaded bushing 28 adapted to be biased away from housing 20 by means of a suitable spring 29. The extreme threaded end of needle 27 is provided with a screw-driver slot 30 and a locknut 31 so that it may be manually positioned in the bushing 28 during shop assembly of the regulating system.

Bushing 28 is pivotally connected to a lever 32 which is supported at its left end by means of a fixed fulcrum in the form of a link 33 pivotally connected to a fixed support. At its right-hand end, lever 32 is connected by a link 34 to the intermediate portion of a lever 35. At one end lever 35 is carried by a fulcrum which is ordinarily fixed but may be manually adjusted. This may take the form of a bushing 36 having rotatably supported therein an adjusting screw 37 provided with a manual adjusting knob 38 and a suitable arrangement for limiting the degree of adjustment of knob 38, such as the locknuts 39 which permit the adjusting screw 37 to be raised and lowered only through a preselected range.

At its opposite end, lever 35 is pivoted to the operating rod 40 of a second hydraulic motor indicated generally at 41. This motor is of any suitable type but may be of construction similar to the motor 7. A viscosity responsive pressure signal $P_2$ is communicated to motor 41 through a conduit 42. In order to facilitate certain modifications of the action of the governing system, as may be indicated by experience in actual service, the links 33, 34 are adapted to be connected to levers 32, 35 in a plurality of locations as determined by the several pivot holes 33a, 34a, 35a. It is often found that the practical operating engineer can, on the basis of the performance of the system in actual service, make such minor adjustments to the regulating system as will cause the prime mover to more accurately follow the precise operating schedule desired.

Connected to the housing of the liquid regulating valve 19 and in communication with the discharge chamber 23 is the viscosity responsive element indicated generally at 43. This comprises essentially two flow restrictions in series relation, the first being a "capillary" passage through which the flow varies materially with changes in viscosity, while the second is a frictionless or "non-capillary" orifice through which the flow is substantially independent of changes in viscosity. It will be seen from the following description and the accompanying drawings that the first restriction is not a "capillary" passage in the ordinary sense of the word; and I desire it to be understood that the term "capillary restriction" as used herein includes all forms of fluid flow restricting devices in which friction effects produce material change in resistance to flow as viscosity changes. Both flow restrictions are housed in a common casing 44 which has a central axial bore extending entirely through the housing. At one end housing 44 may be threaded into a recess in the side of needle valve housing 20 so that the central bore of housing 44 is in communication with the discharge chamber 23.

The opposite end of housing 44 is closed by means of a cap member 45 defining a discharge chamber 46. As will be apparent from Fig. 1, oil is supplied to the bore in housing 44 from needle valve chamber 23, and is drained from discharge chamber 46 by way of the conduit 26. The end cap 45 is also provided with an atmospheric vent 47, the purpose of which is to insure that the static pressure $P_0$ in chamber 46 will be exactly equal to atmospheric pressure, that is, zero gage pressure. The reservoir 15 may also be provided with an atmospheric vent 15a. It may be found that vent 15a is sufficient to insure that the pressure $P_0$ will be exactly zero gage pressure, in which case the vent 47 may not be needed.

The central bore of the housing 44 includes, adjacent the discharge chamber 23, an elongated cylindrical portion of constant diameter having supported therein a cylinder 48 which defines with housing 44 an annular flow path 49 of comparatively small radial width and of considerable longitudinal length. To hold the cylinder 48 exactly coaxial with the bore, a small diameter cylindrical extension 50 may be provided at each end of cylinder 48. Each of these extensions 50 is provided with several radially extending arms 51, the outer ends of which snugly engage the inner surface of the central bore in housing 44. Thus the small radial clearance between housing 44 and cylinder 48 constitutes a capillary passage of comparatively large cross-section area yet presenting a large area of liquid-to-solid contact surface, so that changes in the viscosity of the liquid will produce material changes in the friction forces generated within the liquid. It should also be noted that the radially extending arms 51 define generously proportioned flow paths for the flow of liquid around the cylindrical extensions 50 to and from the annular capillary passage 49.

At the right-hand end of housing 44 is a second cylindrical bore portion 52. Seated in a recess at the exterior end of bore 52 is an orifice plate 53 having a central portion defining a sharp-edged orifice. The end cap 45 may be used to secure orifice plate 53 in position, as shown in Fig. 1. As will also be apparent from Fig. 1, conduit 42 communicates with the bore 52 so as to transmit the viscosity signal pressure $P_2$ to the viscosity compensating motor 41.

The operation of this regulating system is as follows. Rotation of turbine shaft 2 causes the positive displacement pump 16 to generate a pressure in discharge conduit 17 which is a function of the square of the speed of rotation. Because of the mechanical characteristics of bellows 8 and spring 10, there will be a definite position of the actuating rod 6 for each pressure existing in conduit 17 as communicated by conduit 14 to hydraulic motor 13. Assuming constant inlet conditions in the steam supply pipe 4, the energy output of the turbine 1 is proportional to the degree of opening of the inlet valve 5. In other words, there is a definite known relation between the load on the turbine and the signal pressure $P_r$ supplied by conduit 14 to motor 7.

The liquid regulating needle 27 is provided with a carefully contoured end portion so shaped that the effective area of the orifice 22 varies as a straight-line function of the longitudinal position of the needle. Assuming now that needle 27 remains stationary so as to define an orifice of a given effective area, then if the turbine speed should increase, the pressure $P_r$ communicated to hydraulic motor 13 will increase with the result that bellows 8 is compressed and actuating rod 6 is lowered to close the inlet valve 5. This reduces the flow of stream to the turbine 1 with the result that the speed drops, pressure $P_r$ decreases, and bellows 8 extends until it reaches a new equilibrium position. Conversely if turbine speed decreases, the pressure $P_r$ is reduced, bellows 8 extends, and valve 5 opens to increase the supply of steam and raise the speed to a preselected value.

In order to change the speed which the governing system is adapted to hold, the manual control knob 38 may be raised or lowered, as limited by the stops 39. If the adjusting rod 37 is lowered, the lever 35 will rotate counterclockwise about the right-hand pivotal connection with rod 40, with the result that needle 27 will be lowered so as to reduce the area of orifice 22 and increase the pressure $P_r$ supplied to hydraulic motor 13. This will cause actuating rod 6 to descend to decrease the supply of motive fluid to turbine 1. The regulating system will then operate to hold this reduced speed, by reason of the fact that the pump 16 now needs to run slower in order to provide the pressure $P_r$ required to maintain hydraulic motor 13 in its equilibrium position. Conversely, if it is desired to increase the speed of turbine 1, the manual control knob 38 is rotated so as to raise rod 37, which raises needle 27 to decrease the signal pressure $P_r$. This causes control valve 5 to open to admit an increased supply of stream to turbine 1; and at the same time pump 16 must turn faster in order to build up a pressure $P_r$ to hold hydraulic motor 7 in its equilibrium state.

As long as the temperature of the governing liquid remains constant, the above-described parts of the system will effectively maintain the turbine speed constant, assuming constant load on the turbine and constant steam inlet conditions to the turbine. However, the temperature of the parts and of the operating liquid vary over a wide range, for instance from about 70 deg. F. to about 150 deg. F., with the result that the petroleum oils used as the operating liquid change greatly in viscosity, for instance from about 600 to about 80 universal Saybolt-seconds. This introduces an appreciable error into the operation of the basic governing system, for even a comparatively small change in viscosity will introduce the following errors. In the first place, the "flow coefficient" of the metering valve 19 varies as a function of viscosity. A decrease in viscosity results in an increase in the flow coefficient, and vice versa. Secondly, the positive displacement pump 16 will always have some clearance spaces which constitute a restricted leakage path, and the amount of this leakage increases as the viscosity of the operating liquid decreases. Unfortunately, these effects are additive, that is, both tend to decrease the pressure in the hydraulic motor 13 as the temperature rises and viscosity decreases. This makes the turbine speed up in order to hold the inlet valve 5 at the desired fixed position. The net result is that as the regulating oil heats up the turbine speeds up. This is of course undesirable. The function of the viscosity sensing element 43 and the viscosity responsive hydraulic motor 41 is to counteract these adverse effects of viscosity changes.

The compensating action of the viscosity corrector is effected as follows. Assume that the turbine is in normal operation at a desired speed as set by the manual control knob 38, with the regulating needle 27 and the hydraulic motor 7 in an equilibrium condition corresponding to the desired turbine speed. The pressure relief valve 25 serves as a regulator to hold the pressure $P_1$ in chamber 23 at a preselected constant value. Thus the "initial pressure" supplied to the viscosity sensing element 43 is always held constant. Since the lubricating oil, for the bearing 3 and the other elements of the turbine needing lubricant, is taken from chamber 23 by way of the conduit 54, the lubricated elements are always assured an adequate supply of oil because regulating valve 25 maintains the pressure $P_1$ at the preselected desired value. It should be noted that the design of the system is such that the flow through the orifice 22 is always sufficiently great that at least some oil is discharged through the pressure regulating valve 25 into the drain line 26. This insures that any change in the rate of flow through the orifice 22 will not change the initial pressure $P_1$.

In this equilibrium state, a certain amount of oil will flow through the capillary passage formed by the cylinder 48, into the chamber 52, through the sharp-edged orifice 53 and into drain chamber 46. Here the pressure $P_0$ is always maintained at exactly zero gage pressure, that is at atmospheric pressure, by reason of the atmospheric vents 47, 15a. With this arrangement, an intermediate pressure $P_2$ will be established in the cylindrical bore 52, and the viscosity compensating hydraulic motor 41 will assume an equilibrium position corresponding to this "signal pressure." Then as long as the oil viscosity remains constant, the right-hand end of lever 35 will in effect be supported on a fixed fulcrum.

Now if the temperature increases, with a corresponding decrease in the viscosity of the oil, the resistance to flow through the annular capillary passage defined by cylinder 48 will decrease, because of the decreased friction losses within the liquid. On the other hand, the resistance to flow through the substantially frictionless sharp-edged orifice 53 will remain substantially the same. The result is that the signal pressure $P_2$ in the intermediate bore 52 will tend to increase. This causes the bellows of the hydraulic motor 41 to be compressed somewhat and the rod 40 to be lowered so that the regulating needle 27 is moved slightly towards the closed position. The resulting reduction in effective area of orifice 22 causes the pressure signal $P_r$ to increase, so as to slightly close the turbine throttle valve 5. This decreases the turbine speed somewhat to compensate for the above-mentioned tendency for the speed to increase as viscosity decreases. Since changes in viscosity of the oil take place at a relatively slow rate, these actions occur simultaneously although they have been described above as occurring sequentially for purpose of illustration.

Conversely, when the viscosity of the governing oil increases, the resistance to flow through the capillary passage increases and the intermediate signal pressure $P_2$ decreases, with the result that rod 40 rises and needle 27 is moved slightly toward the open position. Thus the increase in the area of orifice 22 compensates for its decreasing flow coefficient, as viscosity increases, and for the increased output of the pump, due to decreased leakage with the more viscous liquid. This counteracts the tendency of the turbine to slow down as temperature decreases. By suitable design of the viscosity element 43 and suitable adjustment of the linkage connecting the viscosity motor 41 with the needle 27, a governing system incorporating the invention can be rendered substantially insensitive to changes in the viscosity of the operating liquid over a wide range of temperature.

Attention is directed to the fact that the viscosity sensing element 43 is connected into the hydraulic circuit at the downstream side of the liquid regulating valve 19. It should also be noted that there are no leakage paths through which oil might escape from the hydraulic system between the pump 16 and the liquid regulating valve 19. Thus there are no extraneous factors introduced between the pump 16 and the regulating valve 19 which would cause the pressure $P_r$ to vary as the viscosity changes. In other words, the viscosity compensating arrangement eliminates errors due to pump leakage and changes in the performance characteristics of the needle valve, and the system is arranged so that no additional sources of error are present.

With respect to the adjustments possible in the linkage connecting lever 35 to the regulating needle 27, it may be pointed out that shifting the link 34 to the right, as by pivoting it in the extreme right-hand holes 34a, 35a, respectively, has the effect of increasing the rate of response of the needle valve 27 to changes in the signal pressure $P_2$, thus increasing the viscosity compensating effect. Conversely by moving the link 34, parallel to itself, to the left, the compensating effect is reduced.

The viscosity sensing element 43 must be very carefully designed in order to effect the compensating function described above. It is necessary that the capillary passage and non-capillary orifice be properly dimensioned and that they be properly matched to each other. The manner in which this is accomplished is generally as follows, referring now to Figs. 2 and 4.

Fig. 2 is a very diagrammatic cross-section (not drawn to the same scale as Fig. 1) showing the critical dimensions of the viscosity sensing device in terms of the notation used in the formula given hereinafter.

By analysis of the system described above, it can be shown that the viscosity signal pressure $P_2$ is related to the initial pressure $P_1$ and to the geometry of the viscosity sensing device 43 by the following formula:

$$(1) \quad \frac{P_1-P_2}{\sqrt{P_2-P_0}}=3\sqrt{2g}\times\frac{\mu L c d_0^2}{h^3 d_m \sqrt{\rho}}=K\mu c$$

where $P_1$ is initial pressure—lb./in.$^2$, gage
$P_2$, signal pressure—lb./in.$^2$, gage
$P_0$, final pressure—lb./in.$^2$, gage
$g$, gravitational constant—32.16 ft./sec.$^2$
$\rho$, density of the liquid—lb./ft.$^3$
$\mu$, absolute viscosity—lb.-sec./ft.$^2$
$d_m$, $D$, $d$, $d_0$, $L$, $h$, dimensions per Fig. 2—inches
$c$, flow coefficient for sharp-edged orifice 53
$h = \frac{D-d}{2}$
$d_m = \frac{D+d}{2}$ or mean diameter of capillary passage 49
$K$ = proportionality constant In the derivation of Formula 1 the following assumptions are made. The "velocity of approach" to the capillary passage is assumed to be zero, as is substantially true when the passages through the support arms 51 and around the support spindle 50 are sufficiently generously proportioned. The effect of acceleration losses in the capillary passage 49 is neglected, for they are very small when the annular capillary passage having a comparatively large cross-section area is employed. (It may be noted that if a simple capillary tube were employed, the cross-section area, for a given desired schedule of change in pressure $P_2$ with changes in viscosity, would be so small that the effect of acceleration losses would be appreciable.) As indicated in the above description of the apparatus, the initial pressure $P_1$ is maintained constant at a preselected value by the pressure regulating valve 25. Also the final pressure $P_0$ is zero gage pressure, by reason of the atmospheric vents 47 and 15a. The density $\rho$ is taken as an average value in the temperature range to be encountered, and is assumed to be constant. Since the variable $P_2$ cannot be readily separated mathematically in this formula, and since the value of the flow coefficient $c$ varies with viscosity, a mathematical solution of Formula 1 must be arrived at by the method of "successive approximations." The variation of the flow coefficient for a sharp-edged orifice, as a function of Reynolds number, is known. (See for instance an article entitled "Orifice discharge coefficients for viscous liquids," by G. L. Tuve and R. E. Sprenkle, in the magazine "Instruments" for November 1933, pages 201–206.) Having given the viscosity and density of the oil, a value for $c$ is assumed. Then $P_2$ can be solved for, for a given geometrical configuration of the viscosity corrector, and from this value of $P_2$ and the known viscosity and dimensions of the orifice, a Reynolds number may be determined from which an approximately correct value for $c$ may be found in the published data referred to above. This new value of $c$ is then used in making a new solution of the formula. This process may be repeated until any desired degree of accuracy is obtained.

As a matter of fact, any such mathematical solution will be only approximate, because of the practical difficulties of manufacturing the sharp-edged orifice in strict accordance with theory; however, the actual design of the viscosity element may be arrived at as follows: Having given Formula 1, the viscosity sensitive element 43 is designed by first assuming geometrical proportions. To this end, the general proportions may be assumed similar to those shown in Fig. 1. Specific values for the critical dimensions of a viscosity sensing element which has worked well in service are given by the legend in Fig. 2. Having built a sample element 43, a simple test may then be made to ascertain the variation of the signal pressure $P_2$ with changes in temperature and viscosity. For this purpose the initial pressure $P_1$ and final pressure $P_0$ would be held at the design values to be encountered in actual service, and the oil would be heated to change its viscosity. From such a test, a curve similar to that shown in Fig. 4 would be obtained. If this curve is plotted on logarithmic scales, it will be very nearly straight except for some slight curvature at the ends as shown in Fig. 4. The problem then is to obtain a viscosity curve which will be substantially straight over the range of temperatures to be encountered. It is also desirable to have a sufficiently rapid change of the signal pressure $P_2$ as the viscosity changes in order to produce effective actuation of the viscosity compensating motor 41 and the linkage which positions the regulating needle 27. Having given the test results on the sample viscosity sensing element, it can be ascertained by inspection of Formula 1 which dimensions of the element 43 should be altered, and in which direction they should be changed, in order to obtain a desired value and a desired rate of change for the signal pressure $P_2$, taking into consideration the known variation of the flow coefficient $c$ and the variation of viscosity with temperature. It will be observed that the expression (1) reduces to the form of a proportionality constant K, representing the geometrical configuration of the element 43, times the viscosity $\mu$ and the flow coefficient $c$. As noted above, $\mu$ and $c$ vary in a manner which is not readily susceptible to rigorous mathematical treatment and therefore it is not possible to solve Equation 1 by simple algebra. It is however possible by engineering analysis, guided by Equation 1, to arrive at a design for the sensitive element 43 which will work effectively in the manner described above. Knowing the characteristics of the viscosity sensitive element 43, the compensating motor 41 and the mechanical linkage connecting it to the liquid regulating needle 27 may be appropriately designed and constructed to effect the degree of viscosity compensation desired.

Operation of a 50 kw. turbine with steam inlet conditions of 600 pounds per square inch gage, and 700 deg. F. has shown that a governing system substantially in accordance with Fig. 1 is capable of holding the turbine speed constant within 4%, even though the temperature varies widely over a range from 70 to 150 deg. F. with an oil of the grade known as "SAE 20."

The comparatively simple governing system of Fig. 1 may also be adapted to govern a turbine in accordance with an operating condition of the driven device. Such an arrangement is illustrated diagrammatically in Fig. 3. Here the turbine 1 is arranged to drive a load device such as a blower or compressor 55, and the turbine governing system is arranged to regulate turbine speed so that the discharge pressure in the blower conduit 56 will be maintained constant at a desired value. To this end a pressure sensing conduit 57 communicates the blower discharge pressure to a pressure responsive motor 58 which may be similar in arrangement to the hydraulic viscosity compensating motor 41. Motor 58 has an actuating rod 59 connected to one end of a lever 60, the other end of which is carried on a fixed fulcrum. An intermediate point on lever 60 is connected to the left-hand end of needle actuating lever 32 by means of a link 61. The arrangement of the other elements of the system are as described above in connection with Fig. 1.

Such a system will accurately control the turbine 1 so that the blower discharge pressure is maintained at a preselected value, which may be adjusted by means of a manual adjustment of the length of rod 59 as by providing its lower end with a thread 59a engaging the bushing 59b, so that manual rotation of rod 59 moves it into or out of the bushing. Changing the characteristics of the spring inside the flexible bellows of motor 58 will also alter the blower pressure maintained. The manual knob 38 may be set at its uppermost speed setting, so that in the event of failure of pressure in conduit 57, the turbine will automatically assume the predetermined speed corresponding to the position of knob 38. While my improved governing system has been described as applied to elastic fluid turbines, it will be apparent that, with suitable modifications, it may be used with other prime movers as well.

My invention has been found to provide a mechanically simple and yet very effective means for eliminating adverse viscosity effects from the operation of a prime mover governor of the type described. It will be apparent to those skilled in the art that certain modifications in the arrangement of my governing system may be made, and I desire to cover by the appended claims all such changes as fall within the true spirit and scope of the invention.

What I claim as new and desire to secure by Letters Patent of the United States is:

1. A viscosity-compensated regulating valve for use in a governing system having a control member, pump means adapted to produce a signal pressure, motor means adapted to position the control member in accordance with pump discharge pressure, and walls defining a bleed conduit communicating with the pump discharge, said regulating valve comprising valve means adapted to control the flow of liquid through said bleed conduit, means adapted to hold constant at a preselected value the fluid pressure at the downstream side of said valve means, a viscosity-compensating fluid pressure motor, linkage means connecting the output member of said compensating motor with said valve means to reduce the effective area thereof as the fluid pressure in the compensating motor increases, a viscosity-sensing element comprising walls defining a passage communicating with the downstream side of the valve means and including a capillary and a non-capillary restriction in series flow relation, and conduit means communicating the fluid pressure intermediate the capillary and the non-capillary restrictions to the viscosity-compensating motor.

2. A viscosity-compensated regulating valve for use in a governing system having a control member, pump means adapted to produce a liquid signal pressure, motor means adapted to position the control member in accordance with the pump signal pressure, and walls defining a bleed conduit adapted to drain liquid from the motor, said regulating valve comprising valve means for controlling the flow of liquid through the bleed conduit, a viscosity-sensing element including walls defining a flow path communicating with the downstream side of said valve means and containing a capillary and a non-capillary restriction in series flow relation with the non-capillary restriction discharging to ambient atmospheric pressure, means for holding constant at a preselected value the pressure intermediate said valve means and the capillary orifice, fluid pressure compensating motor means connected to said valve means to reduce the effective area thereof as a function of increasing pressure in the compensating motor, and conduit means communicating the fluid pressure intermediate the capillary and non-capillary orifices to said compensating motor whereby the effective area of the valve is decreased as said intermediate pressure increases.

3. A viscosity-compensated regulating valve for use in a governing system having pump means producing a liquid pressure communicated to a hydraulic motor positioning a control member with a bleed conduit adapted to drain liquid from the motor, said regulating valve comprising valve means adapted to vary the flow through the bleed conduit, walls defining a flow path communicating with the bleed conduit at the downstream side of the regulating valve and including a capillary and a non-capillary restriction in series flow relation, pressure regulating means adapted to hold constant the liquid pressure at the downstream side of said valve means, vent means for maintaining substantially ambient atmospheric pressure at the discharge side of the non-capillary restriction, compensating fluid pressure motor means connected to said valve means to decrease the effective area thereof as a function of increasing pressure in the compensating motor, and conduit means communicating to said compensating motor the liquid pressure intermediate said capillary and non-capillary restrictions whereby the flow of liquid through the bleed conduit increases as a function of increasing viscosity of the liquid.

4. A viscosity-compensated regulating valve comprising variable area valve means, a viscosity-sensing element having walls defining a flow path communicating with the downstream side of said valve means and containing a capillary passage and a sharp-edged orifice in series flow relation, means for maintaining ambient atmospheric pressure at the discharge side of the sharp-edged orifice, pressure regulating means for holding constant at a preselected value the pressure intermediate the valve means and the capillary passage, compensating motor means including a pressure-responsive output member, conduit means communicating to said motor the pressure intermediate the capillary passage and the sharp-edged orifice, and linkage means connecting said compensating motor member with the regulating valve, said linkage including a first lever member having one end portion pivotally connected to the compensating motor output member, adjustable fulcrum means connected to the other end of the first lever, a second lever member having one end portion pivotally supported on a substantially fixed fulcrum, link means connecting the other end portion of the second lever with an intermediate portion of the first lever, and means connecting an intermediate portion of the second lever to the regulating valve whereby the effective area of the valve is altered in accordance with changes in pressure between said capillary and sharp-edged restrictions accompanying changes in viscosity of the operating liquid.

5. A viscosity-compensated regulating valve in accordance with claim 4 and including means for adjusting the connections between the link and the first and second lever members respectively for varying the lever ratio to modify the effect of the compensating motor on the regulating valve.

6. Viscosity - compensating regulating valve means in accordance with claim 4 and including means for adjusting the substantially fixed fulcrum of the second lever member.

STEPHEN JACOBS.

REFERENCES CITED

The following references are of record in the file of this patent:

UNITED STATES PATENTS

| Number | Name | Date |
|---|---|---|
| 1,449,736 | Degen | Mar. 27, 1923 |
| 1,566,995 | Standerwick | Dec. 22, 1925 |
| 1,673,953 | Schmidt | June 19, 1928 |
| 1,673,954 | Schmidt | June 19, 1928 |
| 1,975,937 | Graham | Oct. 9, 1934 |
| 2,028,186 | Booth | Jan. 21, 1936 |
| 2,140,735 | Clarke | Dec. 20, 1938 |
| 2,305,971 | Livingston | Dec. 22, 1942 |